United States Patent
Dultz et al.

(10) Patent No.: US 6,727,491 B1
(45) Date of Patent: Apr. 27, 2004

(54) SENSOR AND METHOD FOR DETECTING CHANGES IN DISTANCE

(75) Inventors: Wolfgang Dultz, Frankfurt am Main (DE); Gisela Dultz, Frankfurt am Main (DE); Erna Frins, Montevideo (UY); Heidrun Schmitzer, Regensburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/890,394

(22) PCT Filed: Dec. 9, 1999

(86) PCT No.: PCT/EP99/09845
§ 371 (c)(1),
(2), (4) Date: Dec. 21, 2001

(87) PCT Pub. No.: WO00/45124
PCT Pub. Date: Aug. 3, 2000

(30) Foreign Application Priority Data

Jan. 29, 1999 (DE) .......................... 199 03 447

(51) Int. Cl.$^7$ .................................................. G01J 4/00
(52) U.S. Cl. ............................... 250/227.17; 385/12
(58) Field of Search .................. 250/227.14, 227.17, 250/227.19; 385/12, 13, 11; 356/364, 614, 73.1

(56) References Cited

U.S. PATENT DOCUMENTS 4,389,090 A 6/1983 Lefevre
4,588,255 A * 5/1986 Tur et al. .................. 385/24
5,201,015 A 4/1993 von Bieren et al.

OTHER PUBLICATIONS

F. Wassmann et al., "Berry's phase analysis of polarization rotation in helicoidal fibers." Applied Optics, vol. 37, No. 18, Jun. 20, 1998, pp. 3902–3911.

Y. Libo et al., "Two Dimensional Hibi Fiber–Optic Coil Strain Sensor." Acta Photonca Sinica, vol. 26, No. 7, Jul. 1997, pp. 618, 621–622.

* cited by examiner

Primary Examiner—Kevin Pyo
(74) Attorney, Agent, or Firm—Kenyon & Kenyon

(57) ABSTRACT

The present invention is directed to a sensor for detecting changes in the distance between a first and a second location, having at, least one substantially helically coiled optical fiber, which is able to be mechanically connected to at least one of the locations, and having a light transmitter and a detecting device for optical signals, the detecting device being able to generate an output signal, which is dependent upon the polarization state of the optical signal transmitted via the optical fiber. The present invention is also directed to a method for detecting the changes in distance between a first and a second location, having the following features: at least one of the locations is mechanically coupled to a substantially helically coiled optical fiber; an optical signal having a known polarization state is launched into the optical fiber; following transmission over the connecting line, this is detected in such a way that information is obtained with respect to its polarization state; from this information, the change in distance is determined.

16 Claims, 5 Drawing Sheets

SENSOR AND METHOD FOR DETECTING CHANGES IN DISTANCE

FIELD OF THE INVENTION

The present invention relates to a sensor and a method for detecting changes in the distance between a first and a second location on the basis of optics.

BACKGROUND INFORMATION

It is believed that there are various methods for measuring changes in the distance between movable objects. For example, some methods may involve sensors, such as strain gauges, which are based on electrical methods. Changes in electric capacitance, as well as in magnetic flux are utilized when working with small changes in length. When employing optical methods to determine linear variations there is no need for an electrically conductive connection between the points whose change in distance is to be measured. There are interferometers for small and average distances of about 1 μm to 1 m, moiré systems, as well as transit-time measurements of light pulses. Interferometer systems may be very precise, but they may also be extremely sensitive mechanically. Also, their operation entails substantial outlay for adjustments. For that reason, it is believed that interferometer systems must be set up as substantially vibrationless systems, and they may not be simple to use, especially for detecting changes in the distance between moving objects. It is also believed that moiré systems are likewise precise, but, in a measuring range beyond a few centimeters, they may only be implemented at a considerable expense. Transit-time measurements of optical pulses and/or measurements of frequency shifts produced by the Doppler effect may only be accurate for large distances and may require costly measuring electronics.

The reference "Berry's phase analysis of polarization rotation in helicoidal fibers", by F. Wassmann and A. Ankiewicz, Applied Optics, vol. 37, no. 18, June 1998, discusses a method for calculating the rotation of the polarization of light, which propagates through a helically wound optical fiber. The rotation of the polarization can be utilized for implementing an optical fiber sensor which can be used to determine the size of a displacement.

The reference "Two-dimensional HiBi fiber-optic coil strain sensor", by Y. Libo and A. Farhad, Acta Photonica Sinica, vol. 26, no. 7, July 1997, vol. 26, no. 7, pages 618–622, XP 000884999, discusses that with the aid of a wound optical fiber, to measure mechanical strains, the influence of the mechanical strain on the polarization state of the light is utilized, which propagates through the optical fiber.

The U.S. Pat. No. 5,201,015 discusses a sensor for measuring mechanical strains with the aid of an optical fiber. The optical fiber has concentric windings. When a mechanical tensile stress is exerted on the sensor, the windings are elastically stretched, causing the peripheral path of the windings and, thus, also the optical path length of the light to increase in the optical fiber. The increase in the optical path length is utilized as a measure of the externally acting mechanical strain.

The U.S. Pat. No. 4,389,090 discusses a device for producing specific polarization states of light in an optical fiber. At least one region of the optical fiber is formed as a winding or coil. The polarization state of the light can be adjusted and changed by varying the spatial orientation of the winding or coils, as well as by twisting the optical fiber.

SUMMARY OF THE INVENTION

An exemplary embodiment of the present invention is directed to providing a sensor for detecting changes in distance which is technically simple and inexpensive to implement, does not require any special mechanical stability, and which can be used to precisely determine small positional changes. A further object of an exemplary method of the present invention is to provide a method for detecting changes in distance which is simple to implement.

Another exemplary embodiment of the present invention includes a sensor for detecting changes in the distance between a first and a second location having at least one substantially helically coiled optical fiber, which is able to be mechanically connected to at least one of the locations, and having a light transmitter and a detector for optical signals. In this context, the detecting device is able to generate an output signal, which is dependent upon the polarization state of the optical signal transmitted via the optical fiber. In addition, a reference optical fiber path is provided, which simulates the optical fiber and over which a second optical signal is transmitted, the optical signals transmitted over both paths being detected in a shared or in separate detecting devices so as to enable differences in the polarization state to be determined.

Another exemplary embodiment of the present invention includes a method for detecting distance variations between a first and a second location, where:

a) mechanically coupling at least one location to a substantially helically coiled optical fiber;

b) coupling an optical signal having a known polarization state into the optical fiber;

c) recording the optical signal transmitted over the connecting line in order to acquire information pertaining to its polarization state;

d) determining the change in distance from the information on the polarization state of the transmitted signal; and e) comparing the polarization state of the optical signal following the transmission to that prior to the transmission and/or to a reference polarization state.

Another exemplary embodiment of the present invention involves the polarization of light changing in helically wound optical fibers in response to a change in the helical parameters. The polarization of the light at the output of a simple, helically coiled, optical fiber line is sensitive to movement, in particular to accordion-like movements of the fiber. This dependency of the polarization on the form of the three-dimensional (or non-planar) curve of the fiber can be used directly to measure the form, e.g., the length of the accordion-like movements of the fiber windings. The distance between any two locations can be determined by connecting them using a movable, helically wound, elastic optical fiber line.

In another exemplary embodiment of the present invention, the form dependency of the polarization state at the output end of an optical fiber is at least in part due to the considerable dependency of the fiber's optical activity upon the exact form of its helical windings. In the first approximation, this effect is achromatic and does not result in any polarization mode dispersion. It is believed to be caused by one of the so-called optical Berry phases, the spin redirection phase. This Berry phase or geometric phase is a phase effect produced by the structure of the fiber's space curve and not by a difference in the optical path length, as is the case with the normal dynamic phase of light. Nevertheless, geometric phases lead to the same interference effects of the light as do normal dynamic phases.

The size or magnitude of the spin redirection phase in a helically wound fiber corresponds to the solid angle Ω that the k vector (k corresponds to the propagation constant β in the technical literature) wraps around on the sphere of the light-propagation orientations in the counter-clockwise direction when the light in the fiber is directed through a helical winding.

In another exemplary embodiment of the present invention, light is coupled with a defined polarization state into the coiled optical fiber and the transmitted optical signal is detected so that inferences can be drawn with respect to its polarization state or its individual polarization components after propagating through the optical fibers. From the change in the parameters of the optical signal prior to and following the transmission, or from a comparison to a reference from a calibration measurement or a concurrent reference measurement, inferences can be drawn with respect to the form or the change in the form of the wound optical fiber and, thus, also with respect to changes in the distance between locations connected thereto.

In another exemplary embodiment, for example, polarized light can be coupled into the fiber, and its polarization state or the strength of a specific polarization component can be measured once it has propagated through the optical fiber using a polarimeter or a detector having a series-connected or upstream analyzer. From knowledge of the polarizations or of individual polarization components prior to and subsequent to the transmission, conclusions can be drawn with respect to the change in polarization caused by the form and, thus, with respect to the deformation of the coils.

In another exemplary embodiment of the present invention, if the transmission signal is compared to a reference, then precise knowledge of the polarization state prior to the transmission may not be necessary. It may be sufficient if a defined initial basic situation is always at hand. The reference is constituted, for example, of a series of measured values which were acquired during a calibration measurement using the optical fibers and which specify the output signal at specific distances between the first and second location. Alternatively, a reference signal can also be produced during the measurement in that a reference path, which may simulate the wound optical fiber, likewise receives a defined optical signal, and the two transmission signals are compared to one another. For this, they are either analyzed separately and/or both intensities are compared to one another. The actual transmission signal can also be brought into interference with the reference transmission signal and subsequently can be detected in a shared detector.

Exemplary embodiments of the present invention can eliminate the need for specular surfaces or for a special mechanical stability of the system are virtually universally applicable. The launching the optical signal into the fiber should, in fact, be mechanically stable, but it can be set up separately from the system to be measured. In addition, without entailing substantial technical outlay, the sensor can be assembled from individual, inexpensive components.

DETAILED DESCRIPTION

Figure 1A:
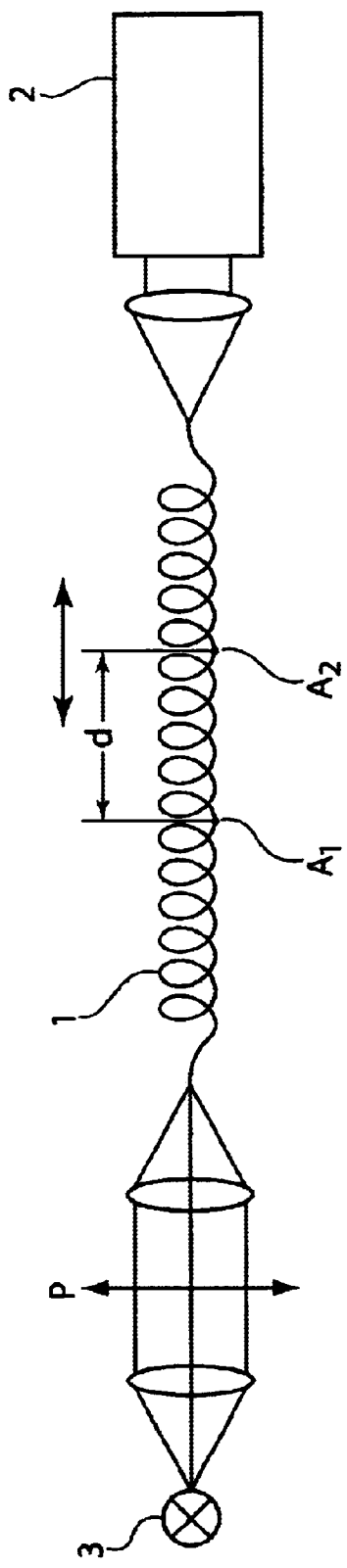
FIG. 1 shows a sensor having a helical optical fiber according to an exemplary embodiment of the present invention.

The lower part of FIG. 1A shows a sensor according to an exemplary embodiment of the present invention having a helical optical fiber 1. The optical fiber has a fixed winding direction. In the case of an arbitrarily bent fiber, it may be sufficient when one winding direction predominates.

In addition, the optical fiber has a cladding which holds the fiber in its helically bent form and is capable of elastically following movements, in particular those along the longitudinal axis of the coil. For this, the coils, as such, can also be embedded in an elastic substrate material, for example, in an elastic cylinder or the like.

The sensor also includes a light source 3, which may be a laser. Linearly polarized light emanating from light source 3 is launched into fiber coil 1. In the case that the light source does not emit fully polarized light, a polarizer P can be positioned at the fiber input end to produce the defined polarization state. At the output end of the fiber coil, the polarization state of the transmitted optical signal can be measured using a polarimeter 2. Alternatively, one can use a simple detector having a series-connected or upstream analyzer to measure the intensity of a defined polarization component.

Figure 1B:
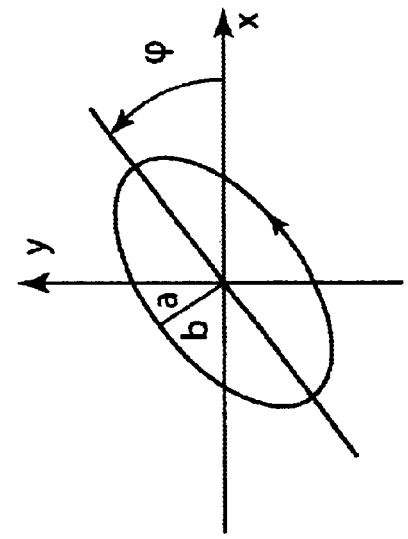

FIG. 1B schematically depicts a polarization ellipse to represent the polarization state of the light once it has propagated through the transmission route. X and y denote the vibration directions of the electric field vector. In the most general case, the field vector describes an ellipse having the main axes a and b, which is rotated by the angle φ in relation to the axes x and y.

Exemplary embodiments of the present invention involve that the orientation angle φ of the polarization ellipse at the output end of the fiber path being proportional to the so-called geometric phase introduced in the coil between the right-hand and left-hand circular component of the injected, linearly polarized light. Since the geometric phase changes with the coil shape, the orientation angle φ is a measure of and/or indicative of the coil shape. In this manner, the distance d between two points A1 and A2 can be measured on the coil and, thus, also the distance and/or the change in the distance between two locations rigidly connected by points A1 and A2.

Figure 2:
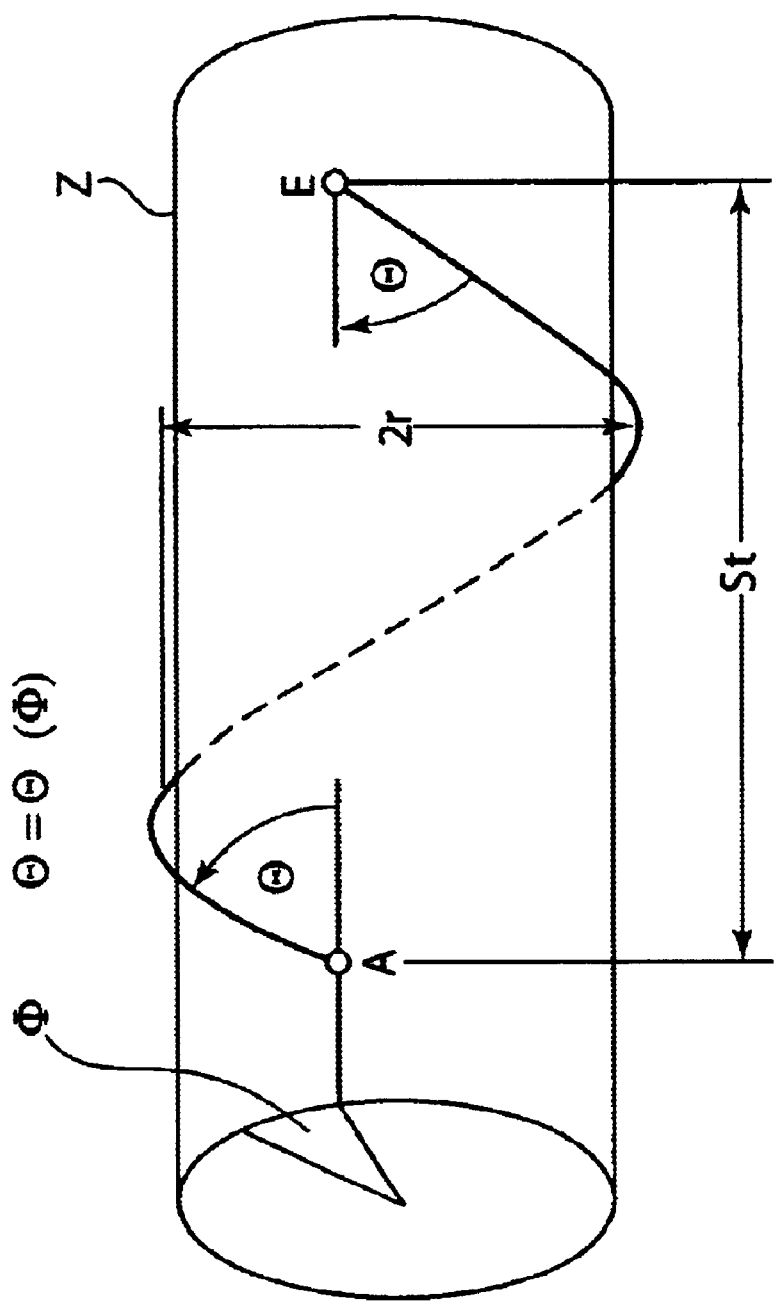
FIG. 2 shows a helical optical fiber according to an exemplary embodiment of the present invention.

Referring to FIG. 2, the geometric spin redirection phase and, thus, the coil form can be determined quite simply. Each complete winding of the optical fiber on a cylinder Z of radius r, having pitch St, for which the lead angle Θ is the same at the beginning A and end E of the winding, produces a rotation φ of the injected, linearly polarized light. The angle of rotation φ is given by $$\varphi = \int_0^{2\pi} [1 - \cos\Theta(\Phi)] d\Phi \qquad (1)$$

In this context, φ is the azimuth angle of cylinder Z; see FIG. 2. For the case of a uniformly wound spiral, Θ is a constant, and one obtains:

$$\varphi(\Theta = const.) = 2\pi(1 - \cos) \text{ and } \cos\Theta = \frac{St}{L} \quad (2)$$

Thus, if one couples a linearly polarized light at angle α into the helix, then at the output end E, it has a polarization rotated by the angle φ thus α±φ. The operational sign of angle of rotation φ depends on the helicity of the coil or screw. L is the length of the fiber helix. At this point, in response to a change in pitch St of the helix, the helix or pitch angle φ and, thus, the polarization direction at fiber end E change. If a linear analyzer is installed at end E and then permits the light to strike a detector, then this registers an intensity I $$I = I \cos^2[\gamma - (\alpha \pm \phi)] \quad (3)$$

where γ is the orientation angle of the analyzer, and $I_0$ is the intensity of the linearly polarized light emerging from the fiber. The assumption here is that lossless conditions prevail and that the light in the fiber ideally remains linearly polarized.

For all other cases, I likewise depends on helix angle Θ and, thus, on the distance between points AE, although in complicated fashion. The correlation (or relation) may be determined through calibration or by measuring the parameters of equation (1), as well the various losses. At the detector, one obtains a signal which is dependent upon distance St to be measured and can be brought into a suitable measuring range by parameters r, γ and α.

It is believed that it is not necessary that only one single winding of the fiber may be used as a distance indicator. In another exemplary embodiment of the present invention, many windings can be used, as in FIG. 1, as well as non-whole numbers of windings. In the case of an integral number of turns or windings N between A and E and given the same helix angles at A and E, the angle of rotation φ may be calculated in accordance with equation (1), it being necessary to extend the upper integration limit to 2πN. Given a number of turns N that is not whole and non-uniform windings, a calibration may be mote advantageous than the calculation, which can no longer be performed in accordance with the simple equation (1).

To fabricate a uniform coil form having constant helix angles, spindles are mounted at points A and E at the beginning and end of the winding about which the fiber can rotate freely with respect to angle Θ. These spindles are disposed perpendicularly to the cylinder axis of the winding. The fiber is mounted on an elastic carrier, which has a pivot at A and E enabling it to rotate about the spindles. Since, in this case, the uniform helix adjusts itself automatically as a geodetic curve between points A and E on the cylinder, equation (3) can be applied for all pitches St of the helix, for whose formation the total length of the fiber suffices.

An optical fiber does not always retain the linear polarization; i.e., when it emerges from the fiber, the light is no longer polarized as it originally was upon its entry into the fiber. This effect is produced, on the one hand, by deviations in the fiber core from circular symmetry and, on the other hand, by birefringence induced by the bending of the fiber. In so-called weakly birefringent fibers, which also feature a low polarization mode dispersion, an orientation distribution of the asymmetry of the fiber core is achieved in all spatial directions, for example, through rapid rotation of the preform when drawing the fibers. Therefore, fibers of this kind may be especially suited for manufacturing a length-measuring or distance-measuring sensor in accordance with the exemplary embodiments of the present invention.

To avoid stress-induced birefringence in the bent fiber, the bending radius of the fiber should not be too small. An estimation of the birefringence in bent fibers is given by L. Jeunhomme, Single-Mode Fiber Optics, N.Y. 1983, p. 60. It is believed to be optimal when the wound fiber helix has a phase lag of less than λ/10, λ being the operating wavelength. On the other hand, even higher strain birefringence values may not substantially interfere with the measuring principle, since, even in the case of elliptically polarized light at the output end of the fiber, the helix deformation causes changes in the orientation angle φ, which can be taken as a measure of the change in length. Large bending radii of the fibers can be achieved both by increasing the helix radius, as well as by enlarging the helical pitch.

A calibration of the sensor also includes changes in intensity in the detector at the fiber end, resulting from bending of the fiber in response to a change in the distance AE. A length measurement obtained by comparing the instantaneously measured values to values determined in a calibration measurement may be advantageous for the practical application of the sensor, since any influences on the polarization state of the light that are not caused by the change in the length of the wound optical fiber may be eliminated.

Figure 3:
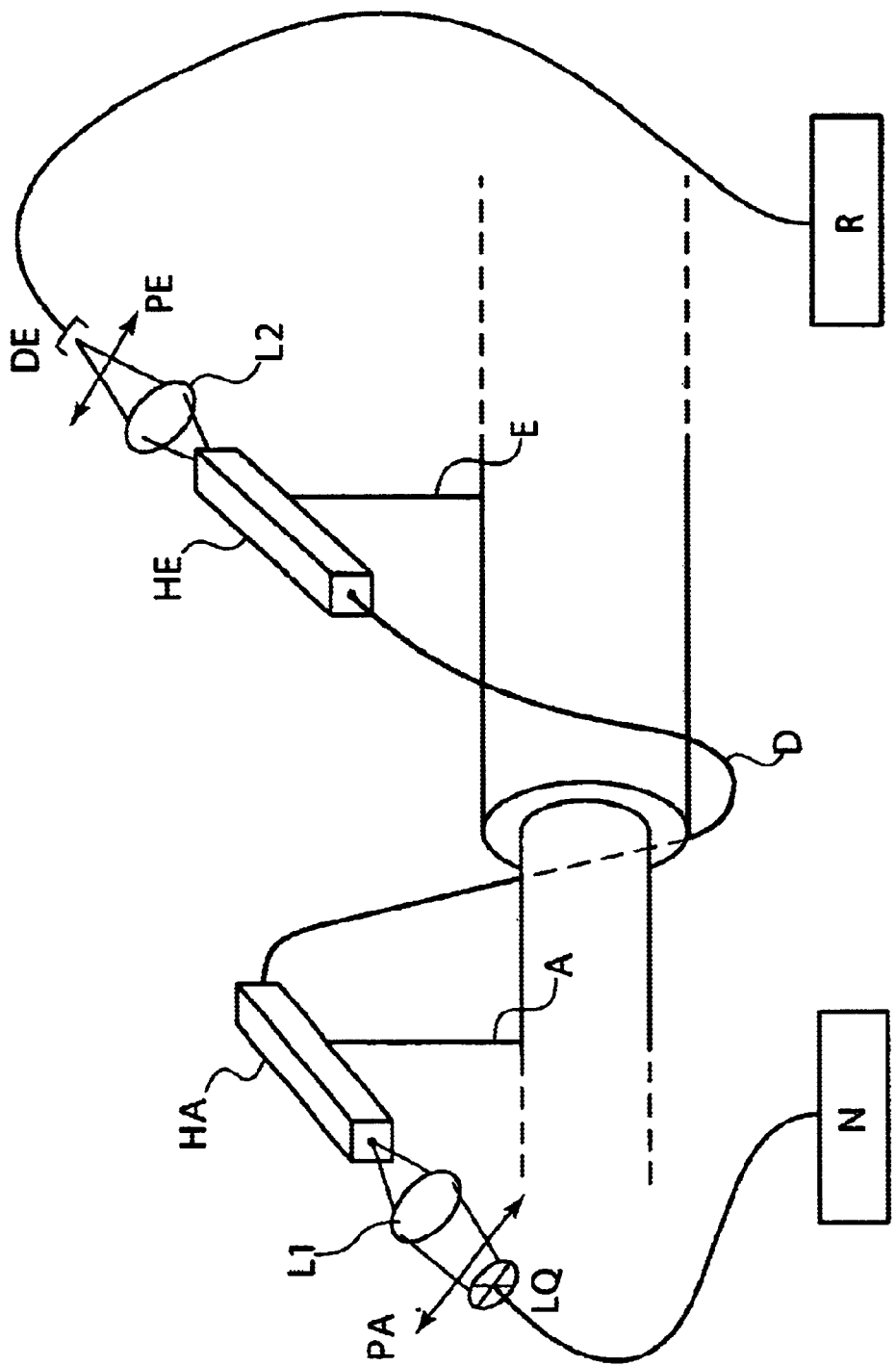
FIG. 3 shows a sensor for measuring changes in the length of a telescope arm according to an exemplary embodiment of the present invention.

FIG. 3 illustrates an exemplary embodiment of the present invention. An elastic fiber carrier D, e.g., a steel, bronze or plastic wire, is provided with two mounting supports HA, HE, which can be fitted on spindles at A and E enabling them to freely rotate. The spindles at points A, E are connected to two tubes of a telescope arm, whose change in length needs to be measured. A helical optical fiber having one single winding is used, which is embedded in fiber carrier D.

Disposed upstream from holder HA is a light source LQ, which can also be mechanically connected to holder HA to assure stable coupling conditions. Light source LQ, which may produce linearly polarized light, is, e.g., a light-emitting diode or a semiconductor laser. The light is coupled via a lens L1 into the optical fiber, whose input end is positioned at holder HA. The fiber is secured on or in elastic fiber carrier D. In the case that the light source emits unpolarized light, linear polarizer PA must also be installed between the light source and the start of the fiber.

At the end E of the winding is holder HE, to which a lens L2 and the fixed or rotatable linear analyzer PE is secured. The lens images light from the fiber onto detector DE. Light source LQ and detector DE are connected via easily movable electric conductors to corresponding network and recording devices N and R, respectively. To avoid interference effects, the light source, detector, and glass fiber are obscured in light-proof manner from the outside world.

Figure 4:
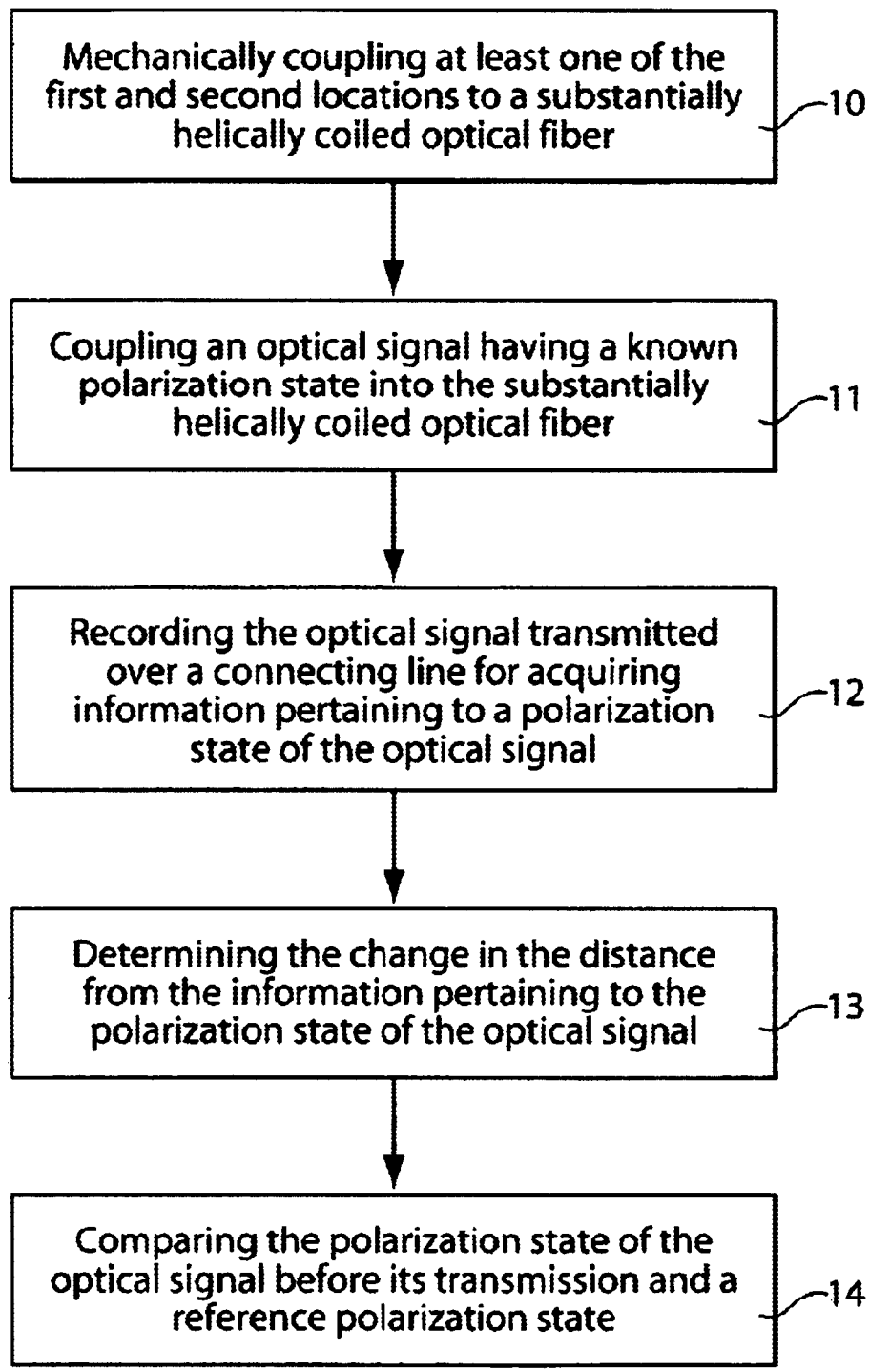
FIG. 4 shows a block diagram demonstrating an exemplary embodiment of the present invention.

FIG. 4 depicts a method according to the present invention including a first step of mechanically coupling at least one of the first and second locations to a substantially helically coiled optical fiber 10. The next step involves coupling an optical signal having a known polarization state into the substantially helically coiled optical fiber 11. The next steps involves recording the optical signal transmitted over a connecting line for acquiring information pertaining to a polarization state of the optical signal 12, and determining the change in the distance from the information pertaining to the polarization state of the optical signal 13. The final step involves comparing the polarization state of the optical signal before its transmission and a reference polarization state 14.

Figure 5:
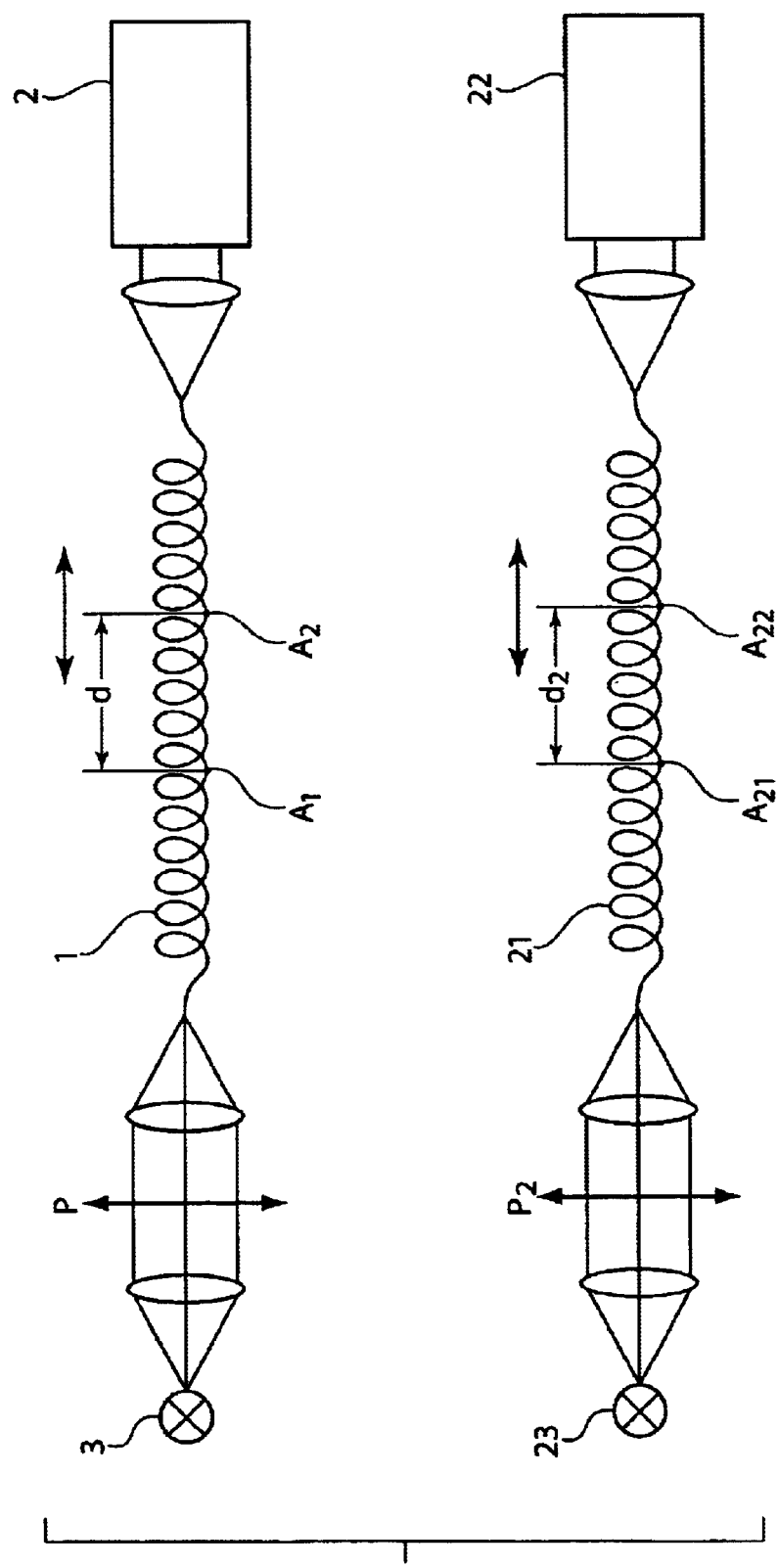
FIG. 5 shows a sensor having a helical optical fiber according to an exemplary embodiment of the present invention.

FIG. 5 depicts an exemplary embodiment similar to that shown in FIG. 1A, plus a reference, optical fiber path 21. The optical fiber may have a fixed winding direction. In the case of an arbitrarily bent fiber, it may be sufficient when one winding direction predominates.

In addition, the optical fiber has a cladding which holds the fiber in its helically bent form and is capable of elastically following movements, in particular those along the longitudinal axis of the coil. For this, the coils, as such, can also be embedded in an elastic substrate material, for example, in an elastic cylinder or the like.

The sensor includes a light source 23, which may be a laser. Linearly polarized light emanating from light source 23 is launched into fiber coil 21. In the case that the light source does not emit fully polarized light, a polarizer P2 can be positioned at the fiber input end to produce the defined polarization state. At the output end of the fiber coil, the polarization state of the transmitted optical signal can be measured using a polarimeter 22. Alternatively, one can use a simple detector having a series-connected or upstream analyzer to measure the intensity of a defined polarization component.

The exemplary embodiments of the present invention may be used in industrial applications to precisely detect changes in length and distance in a multiplicity of systems, such as in robot arms.

What is claimed is:

1. A sensor for detecting a change in a distance between a first location and a second location, comprising:
   at least one substantially helically coiled optical fiber for being mechanically connected to at least one of the first and second locations;
   a light transmitter;
   a detecting device for detecting optical signals and for generating an output signal dependent upon a polarization state of a first optical signal transmitted via the at least one substantially helically coiled optical fiber; and
   a reference optical fiber path for simulating the at least one substantially helically coiled optical fiber and over which a second optical signal is transmittable;
   wherein the first and second optical signals are detectable in one of (i) the detecting device and (ii) the detecting device and another detecting device, for determining any difference in polarization states of the first and second optical signals.

2. The sensor of claim 1, wherein the detecting device is one of a polarimeter and a detector having a series-connected analyzer.

3. The sensor of claim 1, wherein the at least one substantially helically coiled optical fiber is flexible in a helix direction and is for following changes in the distance between the first location and the second location.

4. The sensor of claim 1, wherein the at least one substantially helically coiled optical fiber is joined to an elastic carrier material, which permits a change in form in response to mechanical loading of the at least one substantially helically coiled optical fiber, and which retains the at least one substantially helically coiled optical fiber in an initial curved from in response to no mechanical loading.

5. The sensor of claim 1, wherein the at least one substantially helically coiled optical fiber is wound around an at least one elongated carrier element.

6. The sensor of claim 1, wherein the at least one substantially helically coiled optical fiber is secured to a carrier element so that the at least one substantially helically coiled optical fiber is movable in a wound form but remains stabilized on the carrier element.

7. The sensor of claim 1, wherein one winding direction predominates in the at least one substantially helically coiled optical fiber.

8. The sensor of claim 1, wherein at least one of the following is satisfied: the light source produces linearly polarized light; and a linear polarizer is situated at least one of on and at an input end of the at least one substantially helically coiled optical fiber.

9. A method for detecting a change in a distance between a first location and a second location, the method comprising the steps of:
   mechanically coupling at least one of the first and second locations to a substantially helically coiled optical fiber;
   coupling an optical signal having a known polarization state into the substantially helically coiled optical fiber;
   recording the optical signal transmitted over a connecting line for acquiring information pertaining to a polarization state of the optical signal;
   determining the change in the distance from the information pertaining to the polarization state of the optical signal; and
   comparing the polarization state of the optical signal transmitted with at least one of another polarization state of the optical signal before its transmission and a reference polarization state.

10. The method of claim 9, wherein the step of determining the change in distance includes comparing a detected signal and at least one individual parameter of the detected signal with a value determined in a calibration measurement corresponding to a specific distance.

11. The method of claim 9, wherein the step of determining the change in the distance is performed using a detected signal, at least one individual parameter of the detected signal and a form of a three-dimensional curve of the substantially helically coiled optical fiber.

12. The method of claim 9, wherein the reference polarization state is a polarization state of the optical signal determined following propagation of the optical signal through a communication link in a mechanical idle state.

13. The method of claim 9, wherein the optical signal and a reference signal are detected.

14. The method of claim 9, further comprising the steps of:
   launching a linearly polarized light into the substantially helically coiled optical fiber; and
   detecting a light having a defined linear polarization.

15. The sensor of claim 5, wherein the at least one elongated carrier element is at least one of a cylinder and flexible.

16. The sensor of claim 1, wherein the at least one substantially helically coiled optical fiber has only one winding direction.

* * * * *